(12) United States Patent
Akiyama

(10) Patent No.: US 7,052,141 B2
(45) Date of Patent: May 30, 2006

(54) PROJECTOR WITH IMPROVED LENS APPARATUS

(75) Inventor: Koichi Akiyama, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 10/922,987

(22) Filed: Aug. 23, 2004

(65) Prior Publication Data

US 2005/0157267 A1    Jul. 21, 2005

(30) Foreign Application Priority Data

Aug. 25, 2003   (JP)   ............................. 2003-300039

(51) Int. Cl.
  G03B 21/14   (2006.01)
  G03B 21/20   (2006.01)
  G03B 21/28   (2006.01)
(52) U.S. Cl. ........................... 353/38; 353/98; 353/102
(58) Field of Classification Search .................. 353/20, 353/30, 31, 102, 34, 37, 98, 38; 349/5, 7, 349/9
See application file for complete search history.

(56) References Cited

U.S. PATENT DOCUMENTS

| 6,257,726 B1 | 7/2001 | Okuyama | 353/20 |
| 6,406,149 B1 | 6/2002 | Okuyama | 353/38 |
| 6,414,795 B1 * | 7/2002 | Sugawara | 359/622 |
| 6,607,276 B1 | 8/2003 | Akiyama | 353/38 |
| 6,666,558 B1 * | 12/2003 | Yamagishi et al. | 353/94 |
| 6,866,404 B1 * | 3/2005 | Yamauchi et al. | 362/299 |

FOREIGN PATENT DOCUMENTS

| EP | 1 139 014 A2 | 10/2001 |
| JP | A 9-120067 | 5/1997 |
| JP | 11-125795 | 5/1999 |
| JP | 2000-292740 | 10/2000 |
| JP | 2000-330195 | 11/2000 |
| JP | 2000-330204 | 11/2000 |
| JP | 2000-347293 | 12/2000 |
| JP | 2001-066697 | 3/2001 |
| JP | 2002-189192 | 7/2002 |
| JP | 2002-350778 | 12/2002 |
| JP | 2003-075915 | 3/2003 |
| JP | 2003-233131 | 8/2003 |

* cited by examiner

*Primary Examiner*—Melissa Jan Koval
(74) *Attorney, Agent, or Firm*—Oliff & Berridge, PLLC

(57) ABSTRACT

Exemplary embodiments of the present invention provide an illumination optical device including a light source unit having an arc tube, an ellipsoidal reflector, and a collimator lens, a first lens array to split the luminous flux output from the light source unit into plural partial luminous fluxes, and a superposing lens to superpose the respective partial luminous fluxes split by the first lens array on an image forming region of a liquid crystal panel, and to illuminate the liquid crystal panel in which microlenses are arranged on an incident side of the rectangular image forming region so as to correspond to pixels. By such a constitution, an illumination optical device capable of enhancing image quality and addressing and/or achieving miniaturization and a projector including the device can be provided.

10 Claims, 9 Drawing Sheets

41

PROJECTOR WITH IMPROVED LENS APPARATUS

BACKGROUND

Exemplary embodiments of the present invention relate to a projector.

The related art includes a projector, a so-called 3-LDC projector to split a luminous flux output from a light source unit into color lights of three colors of red, green and blue by a dichroic mirror, to modulate them with respect to each color light in response to image information by three liquid crystal panels (light modulators), to combine the modulated luminous fluxes by a cross dichroic prism, and to enlarge and project a color image via a projection lens.

The related art projector has an illumination optical device 100 as shown in FIG. 9. This illumination optical device 100 has a light source unit 110 and a uniform illumination optical system 150.

The light source unit 110 has an arc tube 12 as a light emitting source, an ellipsoidal reflector 130, and a collimator lens 140. Accordingly, the radial light emitted from the arc tube 12 is reflected by the ellipsoidal reflector 130 and output, and collimated by the collimator lens 140.

The uniform illumination optical system 150 has a luminous flux splitting optical element (first lens array 160), a polarization changer element (PBS array 180), a second lens array 170, and a superposing lens 190. See related art document 1. Accordingly, the system is arranged to split the luminous flux reflected by the ellipsoidal reflector 130 into plural partial luminous fluxes and superpose them on the image forming region of a liquid crystal panel 41.

In such an illumination optical device 100, in order to take in all of the luminous fluxes from the arc tube 12, the outline shapes of the effective luminous flux transmitting regions of the first lens array 160, the second lens array 170, the PBS array 180, and the condenser lens 190, are formed in squares. Further, the side dimensions thereof are made nearly equal to the dimension of the diameter of the reflecting surface in the aperture of the ellipsoidal reflector 130 (hereinafter, referred to as "effective reflecting surface diameter"). Note that the "effective luminous flux transmitting region" is a region in which, of the luminous fluxes respectively passing through these optical components, the luminous flux that can pass through the image forming region (illuminated region) of the light modulator exists. For example, in the vicinity of the second lens array 170, the PBS array 180, and the condenser lens 190, condensed images (arc images) of the plural partial luminous fluxes split by the first lens array 160 are observed, and the effective luminous flux transmitting region in this case is a hypothetical rectangular region that includes these condensed images. Further, in order to enter all of the fluxes output from the collimator lens 140, the first lens array 160, the second lens array 170, the PBS array 180, and the superposing lens 190 arranged at the downstream side of the collimator lens 140 along the optical path, have effective luminous flux transmitting regions of squares having side dimensions thereof equal to that of the collimator lens 140.

On the other hand, the image forming region of the liquid crystal panel 41 is in a rectangular shape formed by significantly shorter short sides and long sides than the dimension of the diameter of the reflecting surface in the aperture of the ellipsoidal reflector 130. Accordingly, a large dimensional difference is produced between the side dimension of the effective luminous flux transmitting region of the superposing lens 190 and the dimensions of the short side and the long side of the image forming region of the liquid crystal panel 41, and the incident angle of the light output from the periphery of the superposing lens 190 to the liquid crystal panel 41 becomes larger. Since the liquid crystal panel 41 is normally designed so that the luminous flux that has been made into a collimated luminous flux by the ellipsoidal reflector 130, a lens, or the like, may enter the image forming region nearly perpendicularly. If the incident angle of the luminous flux becomes larger and the luminous flux enters the image forming region diagonally, the contrast of the projected image is easily deteriorated and the image quality can be degraded.

Further, there is a problem that further miniaturization of the illumination optical device 100 can not be addressed and/or achieved because the side dimensions of the effective luminous flux transmitting regions of the first lens array 160, the second lens array 170, the PBS array 180, and the superposing lens 190 are made nearly equal to the dimension of the diameter of the reflecting surface in the aperture of the ellipsoidal reflector 130 in order to take in all of the luminous fluxes from the arc tube 12.

SUMMARY

An object of exemplary embodiments of the invention is to provide a projector capable of enhancing image quality and addressing and/or achieving miniaturization.

Therefore, exemplary embodiments of the invention address and/or accomplishing the object by adopting the following constitution.

Exemplary embodiments of the invention provide a projector including: a light modulator having a rectangular image forming region to form an optical image by modulating an incident luminous flux in response to image information and microlenses disposed on an entrance side of the image forming region so as to correspond to pixels; a projection optical system to project modulated light from the light modulator; a light source unit having an arc tube, an ellipsoidal reflector to reflect a luminous flux emitted from the arc tube, and a collimator lens to collimate the luminous flux reflected by the ellipsoidal reflector; a luminous flux splitting optical element formed by arranging a plurality of small lenses in a matrix form within a surface perpendicular to an illumination optical axis to split the luminous flux output from the light source unit into a plurality of partial luminous fluxes; and a superposing lens to superpose the respective partial luminous fluxes split by the luminous flux splitting optical element on the image forming region of the light modulator, the collimator lens being disposed in a position where a diameter of the luminous flux reflected by the ellipsoidal reflector is equal to or more than a short side dimension and equal to or less than a long side dimension of the image forming region. Effective luminous flux transmitting regions of the luminous flux splitting optical element and the superposing lens are set in rectangular shapes having side dimensions equal to or more than the short side dimension and equal to or less than the long side dimension of the image forming region.

According to exemplary embodiments of the invention, since the ellipsoidal reflector is used, not only the luminous flux emitted from the light source unit can be reflected simply, but also the reflected luminous flux can be narrowed down to make the diameter thereof smaller. Further, since the collimator lens is disposed in a position where the diameter of the luminous flux reflected by the ellipsoidal reflector becomes equal to or more than the short side dimension and equal to or less than the long side dimension of the image forming region, the effective luminous flux transmitting regions of the luminous flux splitting optical element and the superposing lens disposed at the down stream side of the collimator lens along the light path, can be set in rectangular shapes equal to or more than the short side dimension and equal to or less than the long side dimension of the image forming region. Thereby, the diameter of the luminous flux output from the superposing lens becomes equal to or more than the short side dimension and equal to or less than the long side dimension of the image forming region.

Since the differences between the diameter of the luminous flux output from the superposing lens and the long side dimension and the short side dimension of the image forming region becomes smaller, the incident angle of the luminous flux output from the superposing lens to the light modulator can be made smaller. Since the smaller the incident angle of the incident luminous flux to the light modulator, the better the contrast of the projected image becomes, the image quality can be enhanced compared to the case of using the related art illumination optical device.

Further, the light modulator used in exemplary embodiments of the invention is a light modulator originally having high light usability in which microlenses are disposed on the entrance side of the image forming region. However, if the incident angle of the luminous flux output from the superposing lens to the light modulator is large, a part of light that has been condensed on purpose by the action of the microlenses is hindered in its passing by a black matrix formed in the periphery of the aperture. As a result, the light usability is not enhanced greatly. On the contrary, according to exemplary embodiments of the invention, since the incident angle of the luminous flux output from the superposing lens to the light modulator becomes smaller, the light condensed by the action of the microlenses is never hindered in its passing by the black matrix. As a result, the light usability is enhanced so as to enhance the image brightness. In the case where exemplary embodiments of the invention are implemented in a light modulator (liquid crystal panel) having a size of diagonal lines of less than 0.7 inches (diagonal lines of about 18 mm), because the aperture of the pixel is smaller, the effect becomes significant.

Further, since the incident angle of the incident luminous flux to the light modulator becomes smaller, the exit angle of the luminous flux output from the light modulator also becomes smaller. Accordingly, the number of the projection lens that are provided in the subsequent stage of the light modulator can be made larger, and a projected image with higher resolution and higher definition can be formed.

Further, since the effective luminous flux transmitting regions of the luminous flux splitting optical element and the superposing lens are set in rectangular shapes having the side dimensions equal to or more than the short side dimension and equal to or less than the long side dimension of the image forming region of the light modulator, they can be made smaller in dimensions than the related art collimator lens, luminous flux splitting optical element or the like. Therefore, the projector can be made smaller and lighter.

Note that the phrase "effective luminous flux transmitting regions of the luminous flux splitting optical element and the superposing lens are set in rectangular shapes having side dimensions equal to or more than a short side dimension and equal to or less than a long side dimension of the image forming region of the light modulator" does not mean that the outer shapes of the luminous flux splitting optical element and the condenser lens are set in rectangular shapes equal to or more than a short side dimension and equal to or less than a long side dimension of the image forming region of the light modulator. The outer shapes of the luminous flux splitting optical element and the condenser lens must be in size that can include the effective luminous flux transmitting regions, however, not necessarily be in the same shapes as the effective luminous flux transmitting regions.

In exemplary embodiments of the invention, it is preferred that the arc tube includes a pair of electrodes disposed with predetermined space therebetween and a tubular member in which the pair of electrodes are enclosed, a swelling portion is provided in the space between the electrodes of the tubular member, and a reflecting member to reflect emitted light to the ellipsoidal reflector is mounted at a luminous flux exit part of the swelling portion opposite to the reflector.

In the case of using an arc tube in which no reflecting member is mounted, it is necessary to use an ellipsoidal reflector having a large luminous flux reflecting area (effective reflecting surface area) in order to reflect the light emitted from the arc tube as much as possible. This is because the emitted light not having been reflected by the reflector, can not be utilized effectively. On the contrary, if a reflecting member is provided at the luminous flux exit part of the swelling portion of the arc tube opposite to the reflector, the light output from the arc tube to the aperture side of the ellipsoidal reflector can be reflected to the ellipsoidal reflector side by the reflecting member. Therefore, without using an ellipsoidal reflector having a large luminous flux output area, the loss of light emitted from the arc tube can be reduced or prevented and the light usability can be enhanced.

Further, in the case where an ellipsoidal reflector having a large luminous flux reflecting area is used, since the position where the diameter of the luminous flux reflected by the ellipsoidal reflector is equal to or more than the short side dimension and equal to or less than the long side dimension of the image forming region becomes farther from the arc tube, it is necessary to take a distance between the light source lamp and the collimator lens larger. Further, in the case where the distance from the arc tube is thus taken larger, it is necessary to use the collimator lens having larger refracting power.

On the contrary, if the reflecting member is provided at the luminous flux exit part of the swelling portion of the arc tube opposite to the reflector, because the size of the ellipsoidal reflector can be made smaller, the position where the diameter of the luminous flux reflected by the ellipsoidal reflector is equal to or more than the short side dimension and equal to or less than the long side dimension of the image, the forming region becomes nearer the arc tube. Therefore, the collimator lens can be made closer to the arc tube, and the projector can be made smaller. Further, since the collimator lens can be made closer to the arc tube, the power of the collimator lens can be made smaller.

In exemplary embodiments of the invention, it is preferred that the reflecting member is an auxiliary mirror mounted on the swelling portion or a reflecting film formed on the swelling portion. Thus, by mounting the auxiliary mirror on the swelling portion or forming the reflecting film on the swelling portion, the luminous flux emitted from the swelling portion to the aperture side of the ellipsoidal reflector can be reflected to the ellipsoidal reflector reliably. Therefore, the luminous flux emitted from the swelling portion to the aperture side of the ellipsoidal reflector can be prevented from being output without being reflected by the ellipsoidal reflector, and light usability can be made higher. By the way, as the reflecting surface of the auxiliary mirror or the reflecting film, a deposited metal film or dielectric multi-layer film can be preferably used.

In exemplary embodiments of the invention, it is preferred that the collimator lens is a concave lens having an entrance side and/or an exit side of an effective luminous flux transmitting region formed in an aspheric surface. In the case of using a collimator lens having a spherical surface, because spherical aberration is produced, the parallelism at the center of the lens is high, but sometimes the parallelism at the periphery of the lens is poor. On the contrary, if the entrance side and/or the exit side of the collimator lens is formed in an aspheric surface, the parallelism of the output luminous flux can be enhanced.

Further, it is preferred that the collimator concave lens is any one of (1) a lens having the entrance side of the effective luminous flux transmitting region formed in an aspheric surface having a hyperboloidal shape and the exit side formed in a flat surface, (2) a lens having the entrance side of the effective luminous flux transmitting region formed in a flat surface and the exit side formed in an aspheric surface having an ellipsoidal shape, and (3) a lens having the entrance side of the effective luminous flux transmitting region formed in a spherical surface and the exit side formed in an aspheric surface having an ellipsoidal shape. In the case of (1), because the entrance side is formed in an aspheric surface having a hyperboloidal shape, the luminous flux can be collimated at the entrance side of the effective luminous flux transmitting region of the collimator lens, and not be affected by the refraction action at the exit side. Therefore, the output luminous flux with higher parallelism can be obtained. Further, since the exit side is a flat surface, the collimator lens can be fabricated relatively at low cost. In the case of (2), because the exit surface of the effective luminous flux transmitting region is formed in an aspheric surface, the diameter of the output luminous flux can be made smaller. Further, since the exit surface of the effective luminous flux transmitting region is formed in an aspheric surface, variations in illuminance within the surface of the output luminous flux can be made relatively small. In the case of (3), since the exit surface of the effective luminous flux transmitting region is formed in an aspheric surface, the same effect as in the case of (2) can be exerted. Further, since the entrance side of the effective luminous flux transmitting region is formed in a spherical surface, the light can be reduced or prevented from being refracted at the entrance side, and thereby, output luminous flux with higher parallelism can be obtained.

Further, in exemplary embodiments of the invention, it is preferred that the superposing lens has an entrance side of an effective luminous flux transmitting region formed in a flat surface and the exit side formed in an aspheric surface having a hyperboloidal shape. Thus, since the exit side of the effective luminous flux transmitting region is formed in an aspheric surface, the aberration of the output luminous flux can be made smaller. Therefore, the luminous flux can be reliably entered into the image forming region of the light modulator.

Further, in exemplary embodiments of the invention, it is preferred that a polarization changer element for aligning the directions of polarization of the incident luminous fluxes is provided between the luminous flux splitting optical element and the superposing lens, the polarization changer element having a wave plate made of quartz or mica. According to exemplary embodiments of the invention, the sizes of the luminous flux splitting optical element and the superposing lens can be made significantly smaller than the related art ones. On the other hand, the luminous flux density of the effective luminous flux transmitting regions becomes higher by the miniaturization of these components, and the amount of light per unit area increases. A wave plate using a resin is generally used for the polarization changer element, however, if the amount of light per unit area increases, there is a possibility that the heat resistance becomes insufficient with the resin. Accordingly, using a wave plate made of quartz or mica can enhance the heat resistance of the wave plate.

BRIEF DESCRIPTION OF THE DRAWINGS

FIG. 6($b$) is a schematic diagram for explanation of the constitution of a first lens array 16;

FIG. 6($c$) is a schematic diagram for explanation of the constitution of a second lens array 17 and a PBS array 18;

FIG. 6($d$) is a schematic diagram for explanation of the constitution of a superposing lens 19;

DETAILED DESCRIPTION OF EMBODIMENTS

Hereinafter, exemplary embodiments of the invention will be described in detail according to exemplary embodiments.

A. Exemplary Embodiment 1

Figure 1:
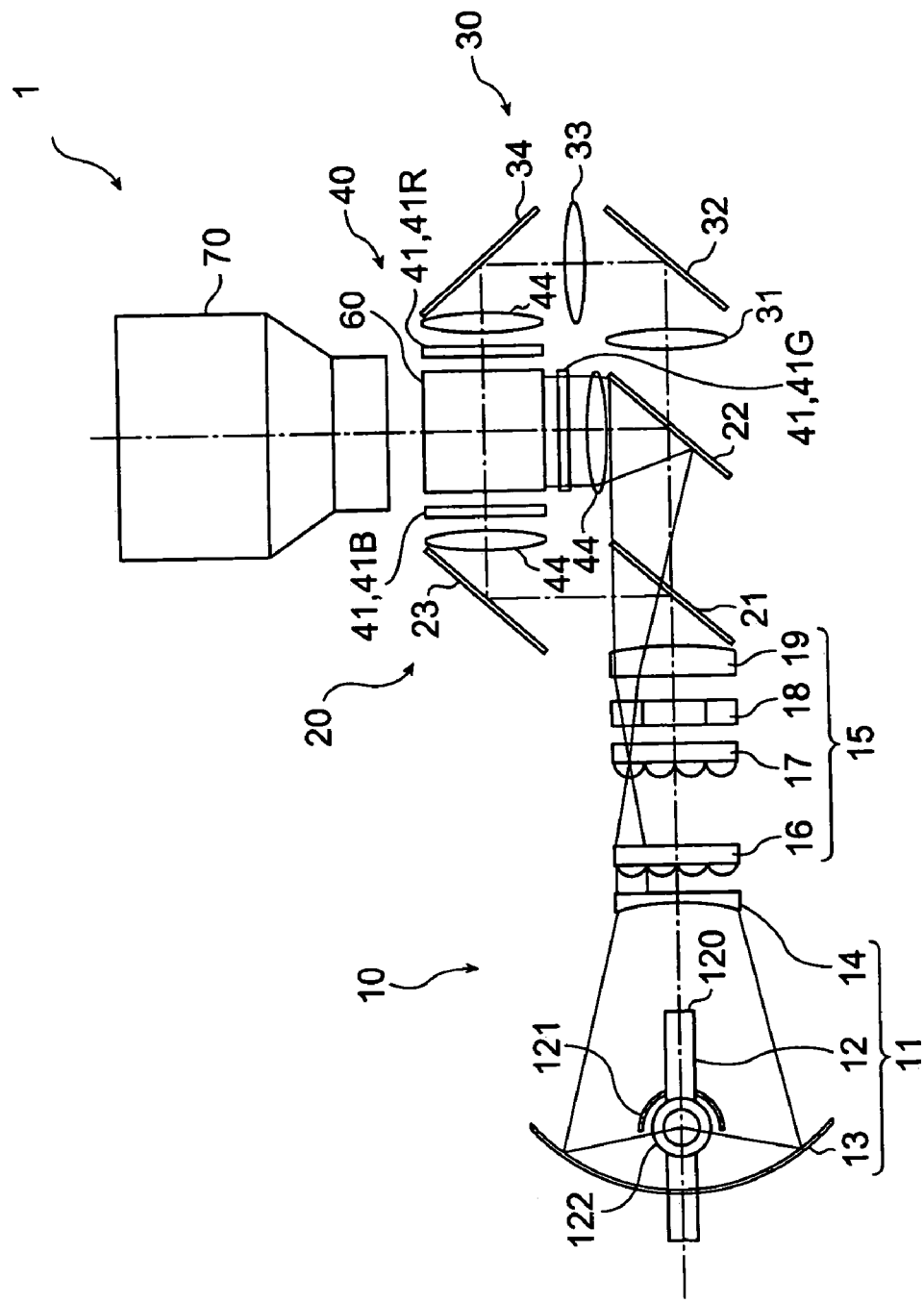
FIG. 1 is a schematic diagram showing an optical system of a projector according to the exemplary embodiment.

FIG. 1 is a schematic diagram showing the structure of an optical system of a projector 1 according to the exemplary embodiment 1 of the invention. The projector 1 includes an integrator illumination optical system (illumination optical device) 10, a color separation optical system 20, a relay optical system 30, an optical device 40, a cross dichroic prism 60 as a color composition optical system, and a projection lens 70 as a projection optical system.

The illumination optical device 10 includes a light source unit 11 and a uniform illumination optical system 15. The light source unit 11 includes an arc tube 12, an ellipsoidal reflector 13 to reflect a luminous flux output from the arc tube 12, and a collimator lens 14.

The uniform illumination optical system 15 is to split a luminous flux output from the light source unit 11 into plural partial luminous fluxes and aligning directions of polarization of the respective partial luminous fluxes in P-polarized light luminous fluxes or S-polarized light luminous fluxes, and is constituted by including a first lens array 16 as a luminous flux splitting element, a second lens array 17, a PBS array 18 as a polarization changer element, and a superposing lens 19 as a superposing lens.

The detailed information regarding the illumination optical system 10 will be described later.

The color separation optical system 20 includes two dichroic mirrors 21 and 22 and a reflecting mirror 23, and separates the plural partial luminous fluxes output from the illumination optical system 10 by the dichroic mirrors 21 and 22 into color lights of three colors of red (R), green (G), blue (B).

The relay optical system 30 includes an entrance side lens 31, a relay lens 33, and reflecting mirrors 32 and 34, and has a function of guiding the red light as the color light separated by the color separation optical system 20 to a liquid crystal panel 41R.

Simultaneously, at the dichroic mirror 21 of the color separation optical system 20, of the luminous fluxes output from the illumination optical system 10, red light and green light are transmitted and blue light is reflected. The blue light reflected by the dichroic mirror 21 is reflected by the reflecting mirror 23, passes through a field lens 44, and reaches a liquid crystal panel 41B for blue. This field lens 44 converts the respective partial luminous fluxes output from the second lens array 17 into luminous fluxes in parallel with their central axis (principal ray). The field lenses 44 provided at the luminous flux entrance sides of other liquid crystal panels 41G and 41R operate similarly.

Further, the green light of the red light and green light transmitted through the dichroic mirror 21 is reflected by the dichroic mirror 22, passes through the field lens 44, and reaches the liquid crystal panel 41G for green. On the other hand, the red light is transmitted through the dichroic mirror 22, passes through the relay optical system 30, further passes through the field lens 44, and reaches the liquid crystal panel 41R for red.

The relay optical system 30 is used for the red light because the length of the optical path of the red light is shorter than the length of the optical path of other color light, therefore deterioration in usability of light due to divergence of light or the like is reduced or prevented. That is, for transmission of the partial luminous fluxes entered into the entrance side lens 31 to the field lens 44 without change. The relay optical system 30 is arranged so as to allow the red light of the three color lights to pass, however, it may be arranged so as to allow the blue light to pass, for example.

The optical device 40 is for forming a color image by modulating the entered luminous flux in response to image information, and includes three entrance side polarizing plates (illustration omitted) into which the respective color lights separated by the color separation optical system 20 are entered, the field lenses 44 disposed on the entrance sides of the entrance side polarizing plates, the liquid crystal panels 41R, 41G, and 41B as light modulators disposed at the downstream sides of the respective entrance side polarizing plates along the optical paths, and exit side polarizing plates (illustration omitted) disposed at the downstream sides of the respective liquid crystal panels 41R, 41G, and 41B along the optical paths, and the cross dichroic prism 60 as a color composition optical system.

Figure 2:
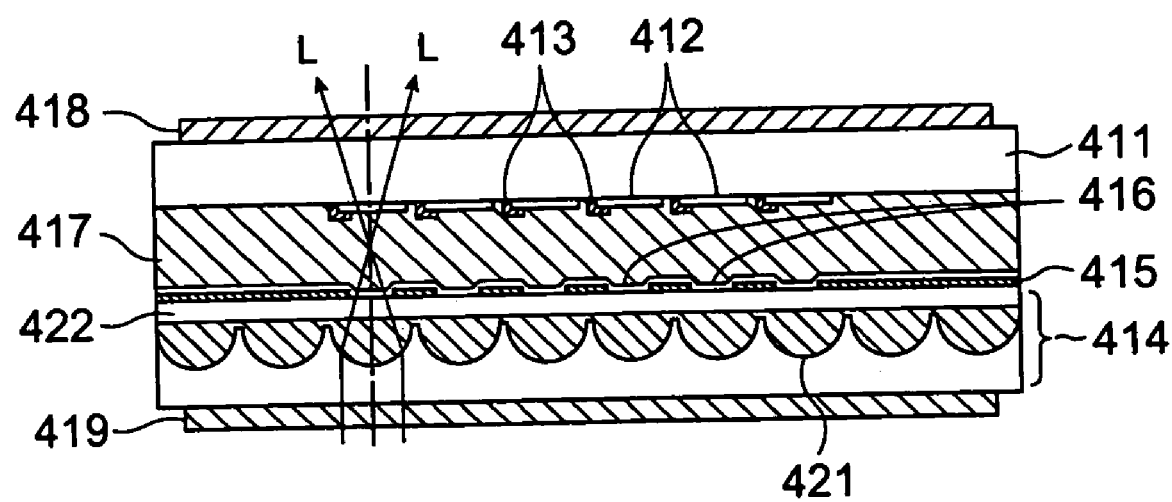
FIG. 2 is a schematic sectional view showing a light modulator (liquid crystal panel)

As shown in FIG. 2, the liquid crystal panel 41 (41R, 41G, 41B) has a structure in which a liquid crystal layer 417 is disposed in space between a TFT substrate 411 having a surface on which a pixel electrode 412, a TFT (Thin Film Transistor) element 413, etc. are formed and an opposed substrate 414 having a surface on which a black matrix 415, a common electrode 416, etc. are formed, and is arranged so as to modulate the direction of polarization of the polarized luminous flux in response to a provided image signal. The image forming region of this liquid crystal panel 41 has a rectangular shape. Further, an exit side polarizing plate 418 is attached to the other surface of the TFT substrate 411, and an entrance side polarizing plate 419 is attached to the other surface of the opposed substrate 414, respectively. The entrance side polarizing plate 419 may be provided on the light entrance side of the substrate 414 and may not unnecessarily be attached to the surface of the substrate 414. Further, the exit side polarizing plate 418 may be provided on the light exit side of the substrate 411 and may not unnecessarily be attached to the surface of the substrate 411. Furthermore, the black matrix 415 may not unnecessarily be formed on the opposed substrate 414. The black matrix 415 may be formed on the TFT substrate 411. Moreover, the black matrix 415 may be formed by superposing light shielding layers formed partially on both of the substrates 411 and 414.

The liquid crystal panel 41 can control the transmittance of incident light L entered from the opposed substrate 414 side with respect to each pixel by controlling the magnitude of the voltage applied between the pixel electrode 412 and the common electrode 416 with respect to each pixel by the operation of the TFT element 413. In addition, by the operation of the black matrix 415, unwanted leakage of light from the parts other than the pixels can be reduced or prevented. Accordingly, the liquid crystal panel 41 forms a liquid crystal display device with high contrast.

Therefore, using the liquid crystal panel 41 as such, a liquid crystal display device with high contrast for the three liquid crystal panels 41R, 41G, and 41B of the projector 1, forms a projector with high contrast and good display quality.

Furthermore, on the entrance side of the opposite substrate 414, microlenses 421 are disposed so as to correspond to the respective pixels, and thereby, the light that is shielded by the black matrix 415 in the case of using no microlens can be utilized effectively. Using such a liquid crystal panel 41 for the three liquid crystal panels of the projector 1 can enhance the brightness of the projector.

The entrance side polarizing plate 419 is an optical conversion element to transmit only the polarized luminous flux in a certain direction and absorbing other polarized luminous fluxes of the respective color lights separated by the color separation optical system 20. Further, similarly, the exit side polarizing plate 418 is to transmit only the polarized luminous flux in a predetermined direction and absorbing other polarized luminous fluxes of the luminous fluxes output from the liquid crystal panel 41 (41R, 41G, 41B).

The field lens 44 is an optical component to make the output luminous flux narrowed by the superposing lens 19 of the illumination optical device 10 in parallel with the illumination optical axis.

The cross dichroic prism 60 is to form a color image by combining the optical images output from the exit side polarizing plate and modulated with respect to each color light.

In the cross dichroic prism 60, a dielectric multi-layer film to reflect red light and a dielectric multi-layer film to reflect blue light are provided nearly in an X shape along interfaces of four rectangular prisms, and three color lights are combined by these dielectric multi-layer films.

Figure 3:
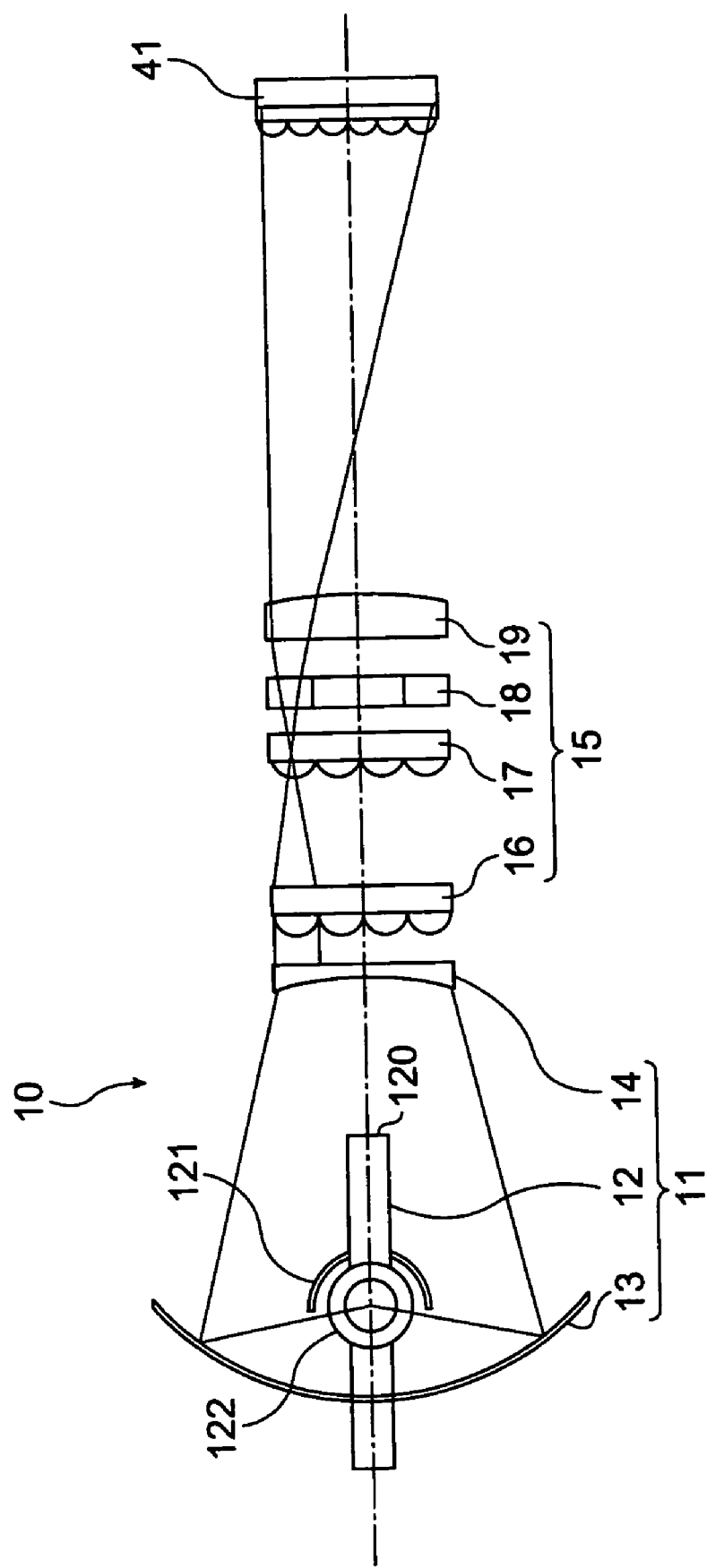
FIG. 3 is a schematic diagram showing the relationship between an illumination optical device and the liquid crystal panel.

The illumination optical device 10 will be described by also referring to FIG. 3. FIG. 3 is a schematic diagram showing the relationship between the illumination optical device 10 and the liquid crystal panel 41.

As described above, the illumination optical device 10 includes the light source unit 11 and the uniform illumination optical system 15. The light source unit 11 includes the arc tube 12, the ellipsoidal reflector 13 to reflect a luminous flux output from the arc tube 12, and the collimator lens 14.

The arc tube 12 includes a pair of electrodes disposed with predetermined space therebetween, and a tubular member 120 in which these electrodes (not shown) are enclosed. The tubular member 120 has a swelling portion 122 swelling outside in the air gap between the electrodes. An auxiliary mirror 121 as a reflecting member is mounted at the light exit part (on the collimator lens 14 side) of the swelling portion 122 opposite to the reflector 13. This auxiliary mirror 121 is to reflect the luminous flux emitted from the swelling portion 122 toward the illuminated region side to the ellipsoidal reflector 13. A gas is enclosed within the swelling portion and, when a voltage is applied between the pair of electrodes, discharge occurs to form a light emitting part (arc). For the arc tube 12, a high pressure mercury lamp, metal halide lamp, or the like can be used.

The collimator lens 14 is to collimate the luminous flux reflected by the ellipsoidal reflector 13. The entrance side of the effective luminous flux transmitting region to the collimator lens 14 is an aspheric surface having a hyperboloidal shape, and the exit side is a flat surface. The collimator lens 14 is disposed in a position where the diameter of the luminous flux reflected by the ellipsoidal reflector 13 is equal to or more than the short side dimension and equal to or less than the long side dimension of the image forming region of the liquid crystal panel 41.

The uniform illumination optical system 15 has the first lens array 16, the second lens array 17, the PBS array 18, and the superposing lens 19.

The first lens array 16 has a function as a luminous flux splitting optical element to split the luminous flux output from the light source unit 11 into plural partial luminous fluxes and is constituted by including plural lenses arranged in a matrix form within a surface perpendicular to the illumination optical axis, and the aspect ratios of the respective lenses correspond to the aspect ratios of the image forming regions of the liquid crystal panels 41R, 41G, and 41B that forms the optical device 40, which will be described later.

The second lens array 17 is a condenser lens to condense the partial luminous fluxes split by the above described first lens array 16, and includes plural lenses arranged in a matrix form within a surface perpendicular to the illumination optical axis similarly to the first lens array 16. The arrangement of the respective lenses corresponds to the lenses that form the first lens array 16. It is unnecessary to make the aspect ratios of the respective lenses to correspond to the aspect ratios of the image forming regions of the liquid crystal panels 41R, 41G, and 41B as is the case for the first lens array 16.

The PBS array 18 as a polarization changer element is an optical component to align the directions of polarization of the respective partial luminous fluxes split by the first lens array 16 in one direction. This PBS array 18 has a polarization split film (not shown) to transmit one polarized luminous flux of two kinds of polarized luminous fluxes of P-polarized luminous flux and S-polarized luminous flux in different directions of polarization and reflects the other polarized luminous flux so as to split them into both of polarized luminous fluxes. Further, the array has a reflecting film (not shown) to fold the traveling direction of the other luminous flux reflected by the polarization split film so as to align the direction with the output direction of the transmitted one polarized luminous flux. Furthermore, the array has a wave plate (not shown) to align the directions of polarization of the two kinds of polarized luminous fluxes. This wave plate is made of quartz or mica in consideration of heat resistance.

By adopting the PBS array 18, the luminous fluxes output from the arc tube 12 can be aligned as polarized luminous fluxes in one direction, and the usability of the light source light can be enhanced.

The superposing lens 19 has a function to condense the plural partial luminous fluxes that have passed through the first lens array 16, the second lens array 17, and the PBS array 18 and to superpose them on the image forming regions of the liquid crystal panels 41R, 41G, and 41B. Regarding the superposing lens 19, the incident side of the effective luminous flux transmitting region is a flat surface and the exit side is an aspheric surface having a hyperboloidal shape.

The effective luminous flux transmitting regions of the collimator lens 14, the first lens array 16, the second lens array 17, the PBS array 18, the superposing lens 19 are substantially in square shapes, and the side dimensions of the respective effective luminous flux transmitting regions are equal to or more than the short side dimension and equal to or less than the long side dimension of the image forming region of the liquid crystal panel 41.

Figure 4:
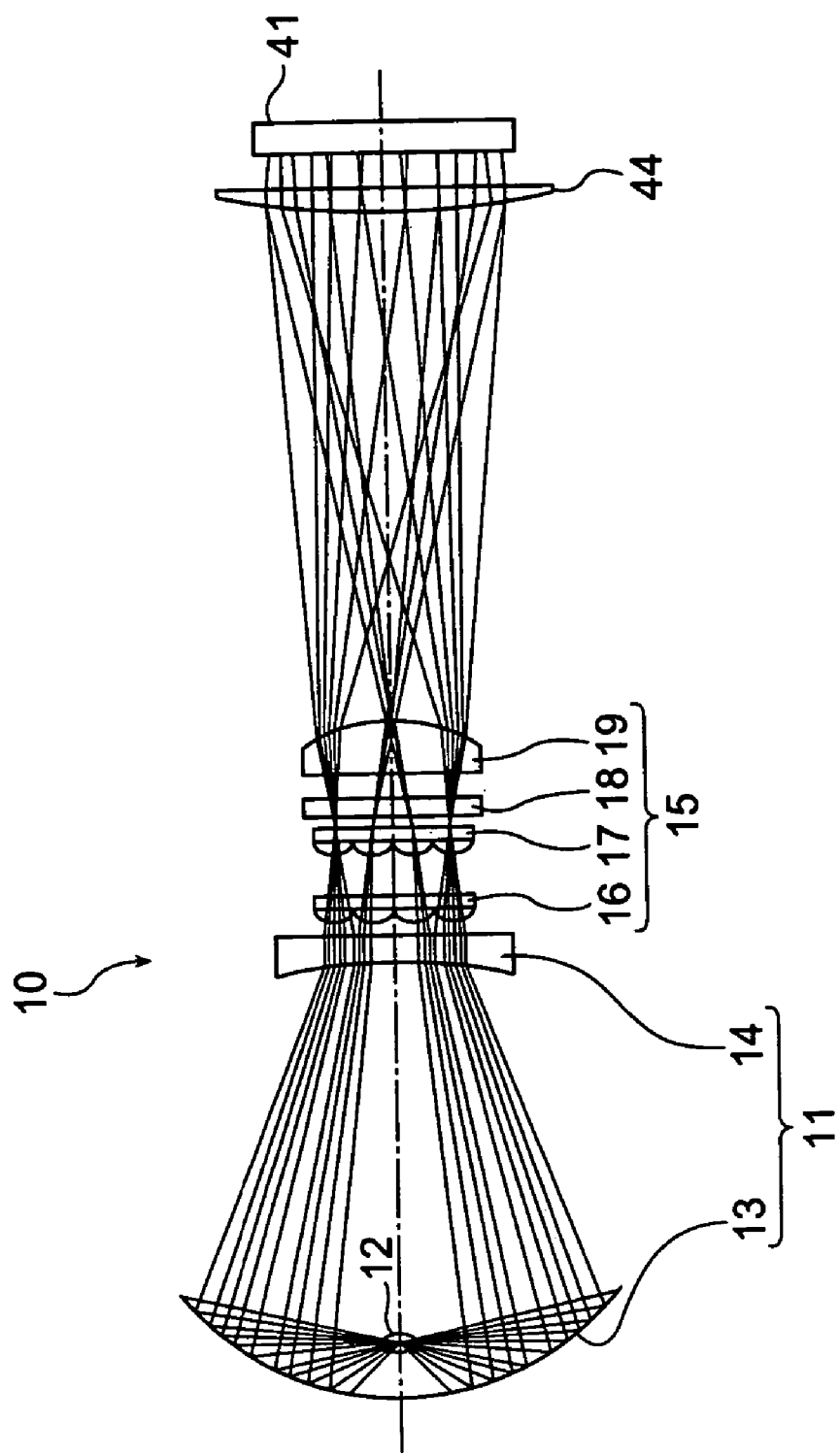
FIG. 4 is a schematic plan view showing the paths of light output from a light source unit.
Figure 5:
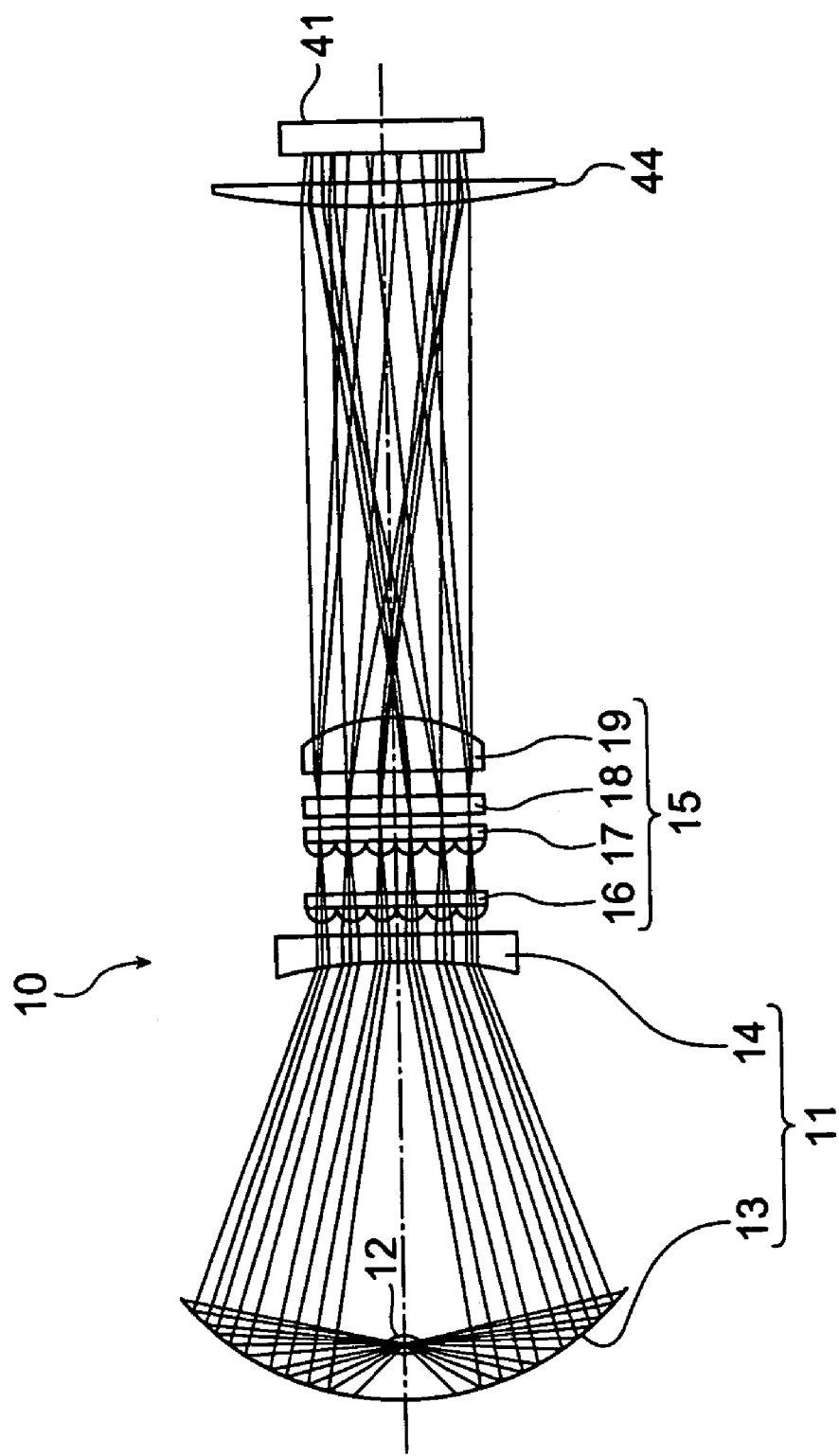
FIG. 5 is a schematic side view showing the paths of light output from the light source unit.

Next, paths of light emitted from the arc tube 12 of the illumination optical device 10 will be described by also referring to FIGS. 4, 5, and 6(a) to (d). FIG. 4 shows the paths of light when the illumination optical device 10 is seen from above. FIG. 5 shows the paths of light when the illumination optical device 10 is seen from the side. Further, in FIGS. 4 and 5, the field lens 44 disposed at the upstream side of the liquid crystal panel 41 along the light path is shown.

In the illumination optical device 10, when the arc tube 12 is turned on, light is emitted and the light is reflected by the ellipsoidal reflector 13. The ellipsoidal reflector 13 not only reflects the light emitted from the light source lamp 12 simply, but also narrows down the reflected luminous flux to make the diameter thereof smaller. The luminous flux reflected by the ellipsoidal reflector 13 is entered into the collimator lens 14 and collimated.

As described above, and, as shown in FIG. 6(a), the collimator lens 14 is disposed in a position where the diameter L13 of the luminous flux 13A reflected by the ellipsoidal reflector 13 becomes equal to or more than the short side dimension L1 and equal to or less than the long side dimension L2 of the image forming region of the liquid crystal panel 41. Accordingly, the diameter L13 of the luminous flux 13B output from the collimator lens 14 becomes equal to or more than the short side dimension L1 and equal to or less than the long side dimension L2 of the image forming region 41A of the liquid crystal panel 41.

Figure 6:
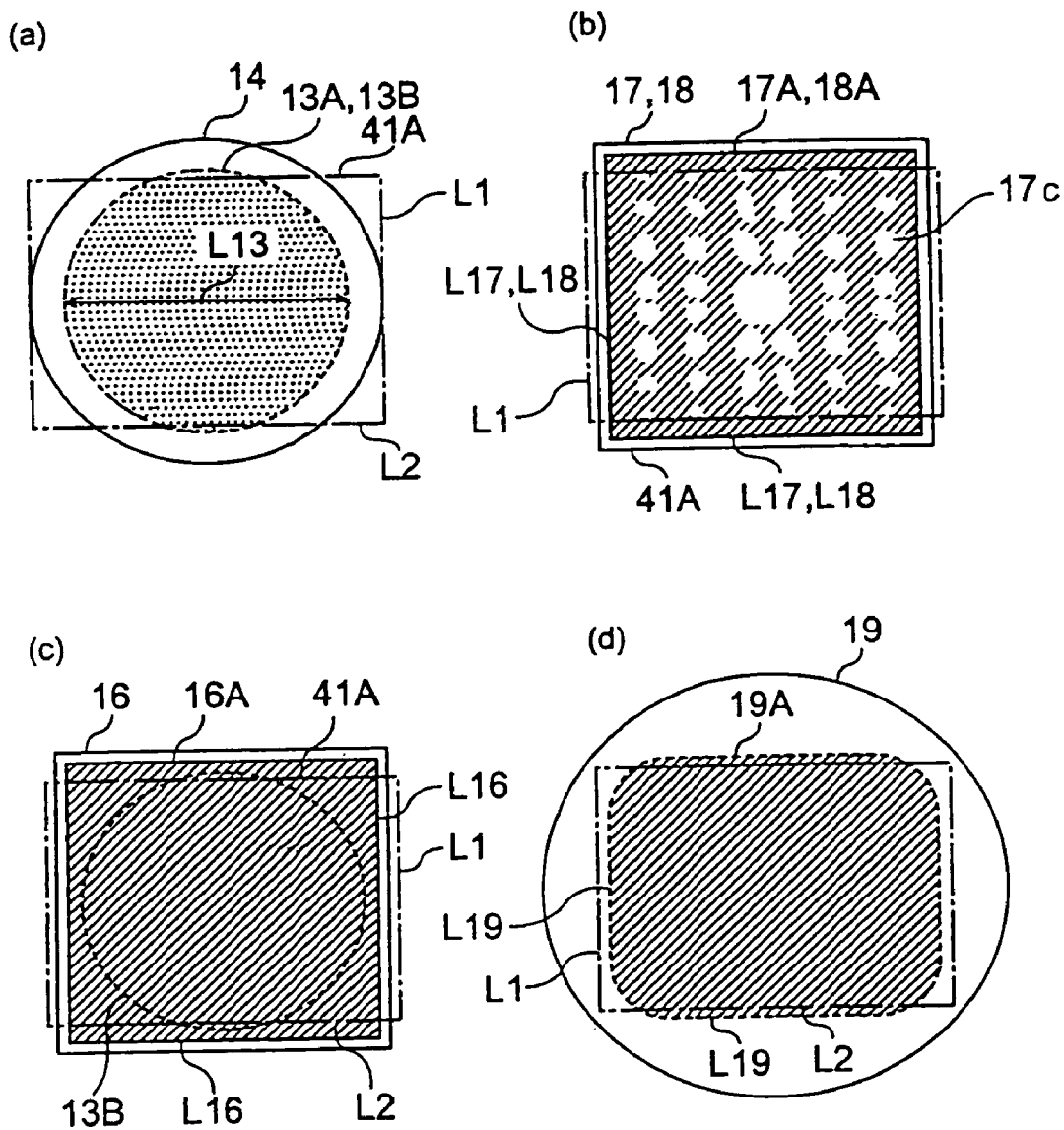
FIG. 6($a$) is a schematic diagram for explanation of the constitution of a collimator lens 14.

The light collimated by the collimator lens 14 sequentially passes through the first lens array 16, the second lens array 17, the PBS array 18, and the superposing lens 19. As shown in FIG. 6(c), the side dimension L16 of the effective luminous flux transmitting region 16A (the region shown by the shaded part in the drawing) of the first lens array 16 is equal to or more than the short side dimension L1 and equal to or less than the long side dimension L2 of the image forming region 41A. As shown in FIG. 6(b), the side dimensions L17 and L18 of the respective effective luminous flux transmitting regions 17A and 18A (the region shown by the shaded part in the drawing) of the second lens array 17 and the PBS array 18, are also equal to or more than the short side dimension L1 and equal to or less than the long side dimension L2 of the image forming region 41A. Further, as shown in FIG. 6(d), the side dimension L19 of the effective luminous flux transmitting region 19A of the condenser lens 19 is equal to or more than the short side dimension L1 and equal to or less than the long side dimension L2 of the image forming region 41A. In FIG. 6(b), plural arc images 17c observed near the second lens array 17 are shown. The effective luminous flux transmitting region 17A is a hypothetical rectangular region that includes these plural arc images. The effective luminous flux transmitting regions 18A and 19A are similar to that.

As seen from FIG. 6(d), the differences between the side dimension L19 of the effective luminous flux transmitting region 19A of the superposing lens 19 and the long side dimension L2 and the short side dimension L1 of the image forming region 41A are extremely small. Further, as shown in FIGS. 4 and 5, it is known that the light output from the superposing lens 19 enters the image forming region of the liquid crystal panel 41 nearly perpendicularly, and the incident angle of the light to the liquid crystal panel 41 is small.

Therefore, according to the exemplary embodiment, the following effects can be exerted.

Since the ellipsoidal reflector 13 is used, not only the luminous flux emitted from the arc tube 12 can be reflected simply, but also the reflected luminous flux can be narrowed down to make the diameter thereof smaller. Further, the collimator lens 14 is disposed in a position where the diameter of the luminous flux reflected by the ellipsoidal reflector 13 becomes equal to or more than the short side dimension and equal to or less than the long side dimension of the image forming region of the liquid crystal panel 41, and the effective luminous flux transmitting regions of the first lens array 16, the second lens array 17, the PBS array 18, and the superposing lens 19 disposed at the downstream side of the collimator lens 14 along the light path, are set in rectangular shapes having side dimensions equal to or more than the short side dimension and equal to or less than the long side dimension of the image forming region. Accordingly, since the differences between the side dimension of the effective luminous flux transmitting region of the superposing lens 19 and the long side dimension and the short side dimension of the image forming region of the liquid crystal panel 41 becomes smaller, the light output from the superposing lens 19 enters the image forming region of the liquid crystal panel 41 nearly perpendicularly. That is, the incident angle of the light to the light modulator can be made smaller. Since the smaller the incident angle of the light to the liquid crystal panel 41, the better the contrast of the projected image becomes, the image quality can be enhanced.

Figure 7:
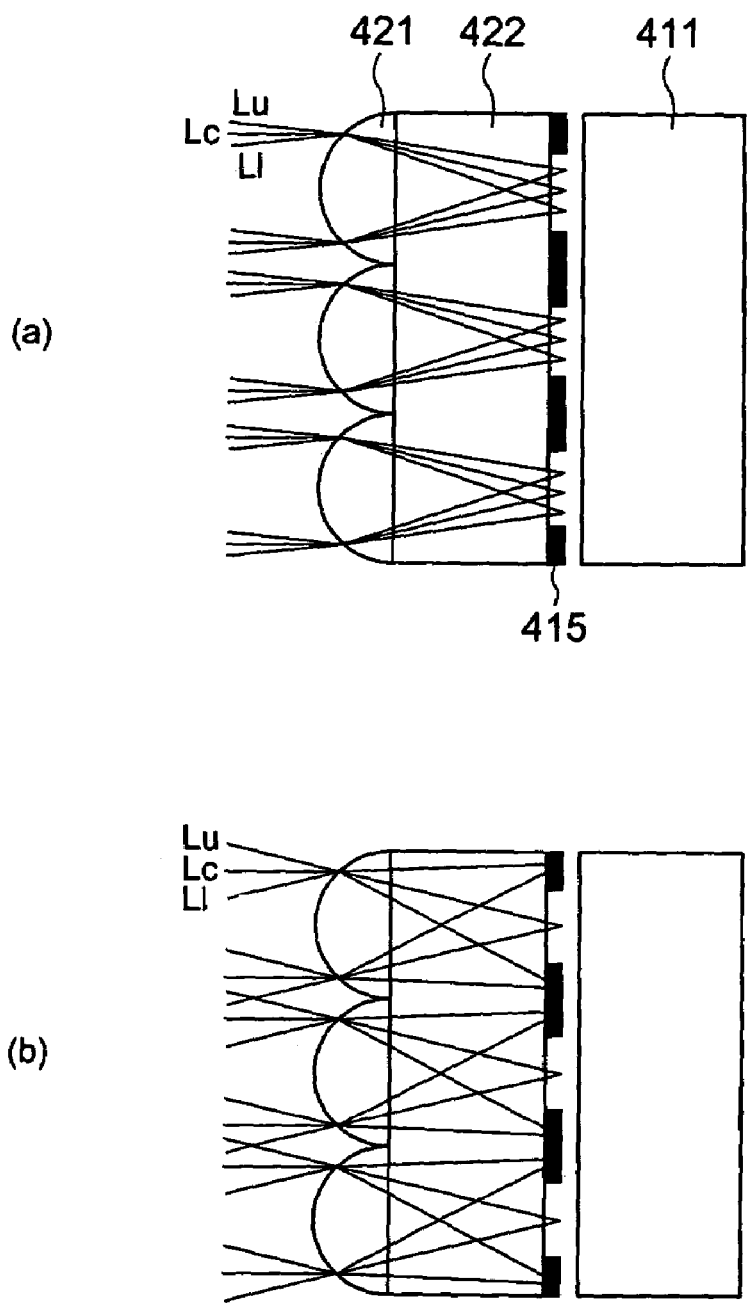
FIG. 7($a$) and FIG. 7($b$) are schematic diagrams showing the states in which the luminous flux enters the image forming region.

FIG. 7 shows a state in which the luminous flux enters the image forming region of the liquid crystal panel 41 used in the illumination optical device of the exemplary embodiment 1. The liquid crystal panel 41 used in the exemplary embodiment 1 is a light modulator originally having high light usability in which microlenses 421 are disposed on the entrance side of the image forming region. However, if the incident angle of the light output from the superposing lens 19 is large, as shown in FIG. 7(b), a part of light that has been condensed on purpose by the action of the microlenses 421 is hindered in its passing by the black matrix 415 formed in the periphery of the aperture, and, as a result, the light usability is not so much enhanced.

On the contrary, according to the illumination optical device 10 of the exemplary embodiment 1, as shown in FIG. 7(a), since the incident angle of the light output from the superposing lens 19 to the liquid crystal panel 41 becomes smaller, the light that has been condensed by the action of the microlenses 421 and is never hindered in its passing by the black matrix 415, and, as a result, the light usability is enhanced so as to enhance the image brightness. In the case where the exemplary embodiment is implemented in a liquid crystal panel having a size of diagonal lines of less than 0.7 inches (diagonal lines of 18 mm), because the aperture of the pixel is smaller, the effect becomes significant.

Further, in the exemplary embodiment, since the incident angle of the light entering the liquid crystal panel 41 becomes smaller, the exit angle of the light output from the liquid crystal panel 41 also becomes smaller. Accordingly, the F number of the projection lens 70 can be made larger, and a projected image with higher resolution and higher definition can be formed.

Furthermore, the side dimensions of the effective luminous flux transmitting regions of the first lens array 16, the second lens array 17, the PBS array 18, and the superposing lens 19 are equal to or more than the short side dimension and equal to or less than the long side dimension of the image forming region of the liquid crystal panel 41. Accordingly, the sizes of these optical components 16, 17, 18, and 19 can be made extremely smaller than the related art luminous flux splitting optical element or the like having the effective luminous flux transmitting region nearly in the same dimensions as the effective reflecting surface diameter of the ellipsoidal reflector 13. Therefore, the projector can be made smaller and lighter.

Further, the auxiliary mirror 121 as a reflecting member is mounted at the luminous flux exit part of the swelling portion 122 of the arc tube 12 opposite to the reflector 13. In the case of using an arc tube 12 in which no reflecting member is mounted, it is necessary to use an ellipsoidal reflector having a large luminous flux reflecting area (effective reflecting surface diameter) in order to reflect the light emitted from the arc tube 12 as much as possible. This is because emitted light not having been reflected by the reflector, can not be utilized effectively. On the contrary, in the exemplary embodiment, since the auxiliary mirror 121 as a reflecting member is mounted in the arc tube 12, the light output from the arc tube 12 to the aperture side of the ellipsoidal reflector can be reflected to the ellipsoidal reflector 13 side by the reflecting member. Therefore, without using an ellipsoidal reflector having a large luminous flux reflecting area, the loss of light emitted from the arc tube 12 can be reduced or prevented and the light usability can be enhanced.

Further, in the case where an ellipsoidal reflector having a large luminous flux reflecting area is used, since the position where the diameter of the luminous flux reflected by the ellipsoidal reflector is equal to or more than the short side dimension and equal to or less than the long side dimension of the image forming region becomes farther from the arc tube 12, it is necessary to take a distance between the arc tube 12 and the collimator lens 14 to be larger. Further, in the case where the distance from the arc tube 12 is thus taken larger, it is necessary to use the collimator lens 14 having larger power. On the contrary, if the reflecting member is provided, the position where the diameter of the luminous flux reflected by the ellipsoidal reflector 13 is equal to or more than the short side dimension and equal to or less than the long side dimension of the image forming region of the liquid crystal panel 14, becomes nearer the arc tube 12. Therefore, the collimator lens 14 can be made closer to the arc tube 12, and the projector can be made smaller. Further, since the collimator lens 14 can be made closer to the arc tube 12, the power of the collimator lens 14 can be made smaller.

Further, since the entrance side of the effective luminous flux transmitting region of the collimator lens 14 is formed in an aspheric surface having a hyperboloidal shape, the luminous flux can be collimated at the entrance side, but not be affected by the refraction action at the exit side. Therefore, the output luminous flux with higher parallelism can be obtained. Further, since the exit side is a flat surface, the collimator lens 14 can be fabricated relatively at low cost.

Furthermore, since the exit side of the effective luminous flux transmitting region of the superposing lens 19 is formed in an aspheric surface, the aberration of the output luminous flux can be made smaller. Therefore, the luminous flux can be entered into the image forming region of the liquid crystal panel 41 reliably. Further, since the entrance side of the effective luminous flux transmitting region is a flat surface, the superposing lens 19 can be fabricated easily.

Further, in the exemplary embodiment, since the effective luminous flux transmitting regions of the collimator lens 14, the first lens array 16, etc. are made smaller as described above, the luminous flux density is higher. Accordingly, it is necessary to enhance the heat resistance of the wave plate of the PBS array 18. In the exemplary embodiment, since the wave plate is made of quartz or mica, the heat resistance can be made higher than a wave plate made of a resin. According to the exemplary embodiment, as described above, the sizes of the collimator lens, the luminous flux splitting optical element, and the superposing lens can be made smaller than those of the related art. On the other hand, since the effective luminous flux transmitting regions are made smaller by the miniaturization of these components, the luminous flux density becomes higher and the amount of light per unit area increases. A wave plate using a resin is generally used for the polarization changer element, however, if the amount of light per unit area increases, there is a possibility that the heat resistance becomes insufficient with the resin. Accordingly, using a wave plate made of quartz or mica can enhance the heat resistance of the wave plate.

B. Exemplary Embodiment 2

Figure 8:
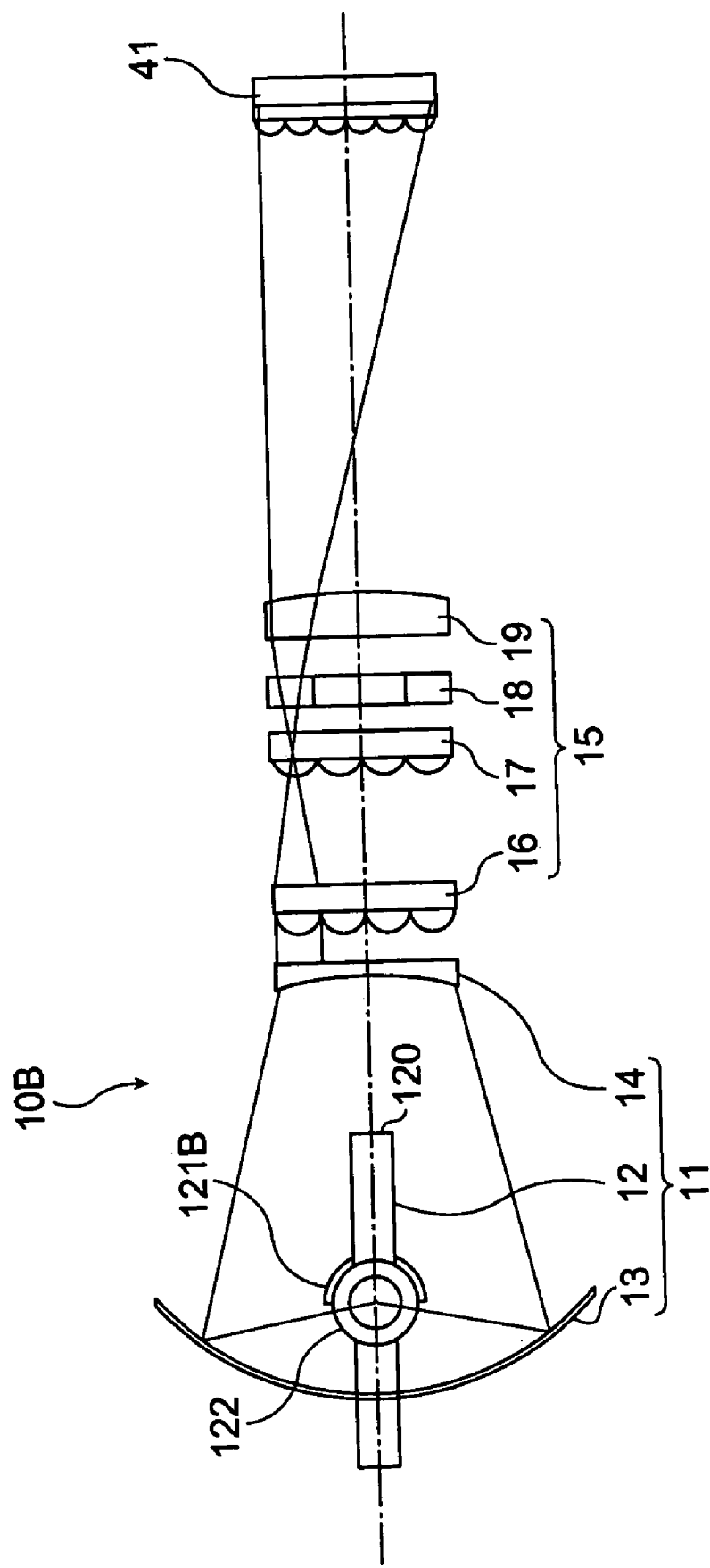
FIG. 8 is a schematic diagram showing the relationship between an illumination optical device and the liquid crystal panel.
Figure 9:
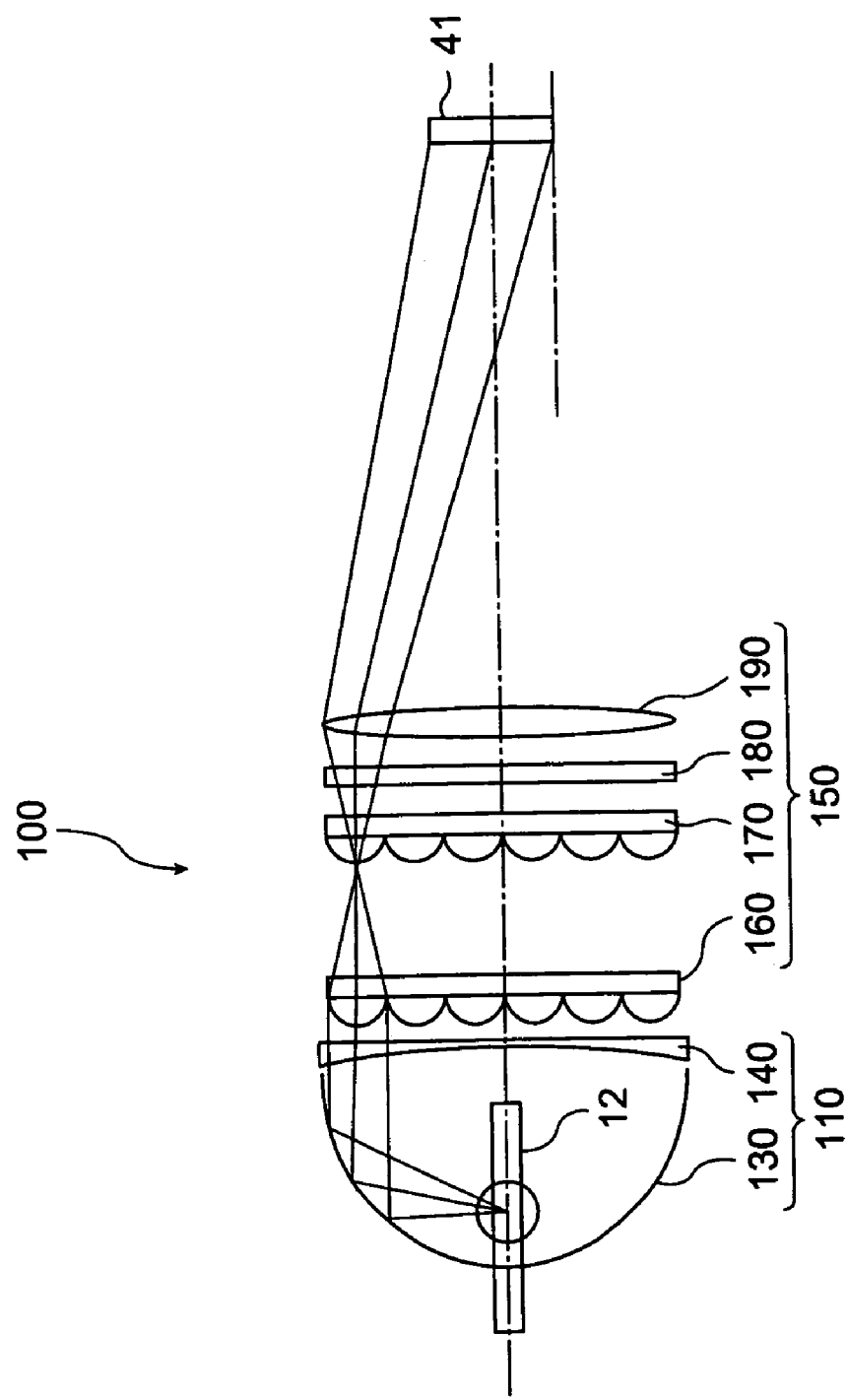
FIG. 9 is a schematic diagram showing the relationship between a related art illumination optical device and the liquid crystal panel.

FIG. 8 is a schematic diagram showing the relationship between an illumination optical device 10B according to the exemplary embodiment 2 and the liquid crystal panel 41. The illumination optical device 10B according to the exemplary embodiment 2 is different from the illumination optical device 10 according to the exemplary embodiment 1 in the constitution of the reflecting member. That is, while the reflecting member is the auxiliary mirror 121 in the illumination optical device 10 according to the exemplary embodiment 1, the reflecting member is a reflecting film 121B deposited on the swelling portion 122 in the illumination optical device 10B according to the exemplary embodiment 2. Accordingly, the illumination optical device 10B according to the exemplary embodiment 2 has the following effect in addition to the effects that the illumination optical device 10 according to the exemplary embodiment 1 has. That is, the number of interfaces that the luminous flux emitted from the illuminated region side of the swelling portion 122 passes through after the luminous flux is reflected until it reaches the ellipsoidal reflector 13 becomes smaller, and thereby, the reflection loss and unwanted influence of refraction when passing through the interfaces can be reduced or eliminated.

Note that exemplary embodiments of the invention are not limited to the above described respective exemplary embodiments, but exemplary embodiments of the invention include alternation, modification, etc. within the scope in which the object of exemplary embodiments of the invention can be addressed or achieved.

For example, in the above described respective exemplary embodiments, regarding the collimator lens 14, the entrance side of the effective luminous flux transmitting region is an aspheric surface having a hyperboloidal shape, and the exit side is a flat surface, however, not limited to that, one having the entrance side formed in a flat surface and the exit surface formed in an aspheric surface having an ellipsoidal shape, or one having the entrance side formed in a spherical surface and the exit surface formed in an aspheric surface having an ellipsoidal shape, may be used.

In the former case, since the exit surface is formed in an aspheric surface, the diameter of the output luminous flux can be made smaller. Further, since the exit surface is formed in an aspheric surface, variations in illuminance within the surface of the output luminous flux can be made relatively small.

In the latter case, the same effect as the former can be exerted, and additionally, since the entrance side is formed in a spherical surface, the light can be reduced or prevented from being refracted at the entrance side, and thereby, output luminous flux with higher parallelism can be obtained.

Furthermore, the collimator lens 14 may have no aspheric surface but only spherical surfaces. In this case, there is a possibility that spherical aberration is produced and the parallelism is deteriorated. However, there is an advantage that the manufacture becomes easier than in the case where the aspheric surface is formed because only the spherical surface must be formed.

Further, in the above described respective exemplary embodiments, regarding the superposing lens 19, the entrance side of the effective luminous flux transmitting region is a flat surface, and the exit side is an aspheric surface having a hyperboloidal shape, however, not limited to that, one having the entrance side formed in a flat surface, may be used.

Further, the wave plate of the PBS array 18 is made of quartz or mica, however, not limited to that, the wave plate may be made of a resin.

Furthermore, in the arc tube 12, the auxiliary mirror 121 is mounted or the reflecting film 121B is formed as a reflecting member, however, such a reflecting member may not necessarily be provided. Thus, the number of components can be reduced. Note that, in the case without the reflecting member, because the luminous flux is output from the arc tube 12 radially, a large ellipsoidal reflector is needed to be used.

In the above described respective exemplary embodiments, the effective luminous flux transmitting regions of, the first lens array 16, the second lens array 17, the PBS array 18, the superposing lens 19 are substantially in square shapes. However, not limited to that, they may be in rectangular shapes having side lengths equal to or more than the short side dimension and equal to or less than the long side dimension of the image forming region of the liquid crystal panel 41. Note that, since the luminous flux has a circular section, there is an advantage that the portion transmitting no luminous flux of the effective luminous flux transmitting region becomes smaller in the case where the region is formed in a square shape as in the above described exemplary embodiments.

The invention claimed is:

1. A projector, comprising:
   a light modulator having a rectangular image forming region to form an optical image by modulating an incident luminous flux in response to image information and microlenses disposed on an incident side of the image forming region so as to correspond to pixels;
   a projection optical system to project modulated light from the light modulator;
   a light source unit having an arc tube, an ellipsoidal reflector to reflect a luminous flux emitted from the arc tube, and a collimator lens to collimate the luminous flux reflected by the ellipsoidal reflector;
   a luminous flux splitting optical element formed by arranging a plurality of small lenses in a matrix form within a surface perpendicular to an illumination optical axis to split the luminous flux output from the light source unit into a plurality of partial luminous fluxes; and
   a superposing lens to superpose the respective partial luminous fluxes split by the luminous flux splitting optical element on the image forming region of the light modulator,
   the collimator lens being disposed in a position where a diameter of the luminous flux reflected by the ellipsoidal reflector is equal to or more than a short side dimension and equal to or less than a long side dimension of the image forming region, and effective luminous flux transmitting regions of the luminous flux splitting optical element and the superposing lens being set in rectangular shapes having side dimensions equal to or more than the short side dimension and equal to or less than the long side dimension of the image forming region.

2. The projector according to claim 1, the arc tube including a pair of electrodes disposed with predetermined space therebetween and a tubular member in which the pair of electrodes are enclosed, a swelling portion being provided in the space between the electrodes of the tubular member, and a reflecting member to reflect emitted light to the ellipsoidal reflector being mounted at a luminous flux exit part of the swelling portion opposite to the reflector.

3. The projector according to claim 2, the reflecting member being an auxiliary mirror mounted on the swelling portion.

4. The projector according to claim 2, the reflecting member being a reflecting film formed on the swelling portion.

5. The projector according to claim 1, the collimator lens being a concave lens having at least one of an entrance side and an exit side of an effective luminous flux transmitting region formed in an aspheric surface.

6. The projector according to claim 5, the collimator lens having the entrance side of the effective luminous flux transmitting region formed in an aspheric surface having a hyperboloidal shape and the exit side formed in a flat surface.

7. The projector according to claim 5, the collimator lens having the entrance side of the effective luminous flux transmitting region formed in a flat surface and the exit side formed in an aspheric surface having an ellipsoidal shape.

8. The projector according to claim 5, the collimator lens having the entrance side of the effective luminous flux transmitting region formed in a spherical surface and the exit side formed in an aspheric surface having an ellipsoidal shape.

9. The projector according to claim 1, the superposing lens having an entrance side of an effective luminous flux transmitting region formed in a flat surface and the exit side formed in an aspheric surface having a hyperboloidal shape.

10. The projector according to claim 1, further comprising a polarization changer element to align the directions of polarization of the incident luminous flux between the luminous flux splitting optical element and the superposing lens,
    the polarization changer element having a wave plate made of quartz or mica.

* * * * *